Nov. 24, 1931.   C. J. BOCK ET AL   1,833,405
RADIUS ROD
Filed Sept. 20, 1929   3 Sheets-Sheet 1
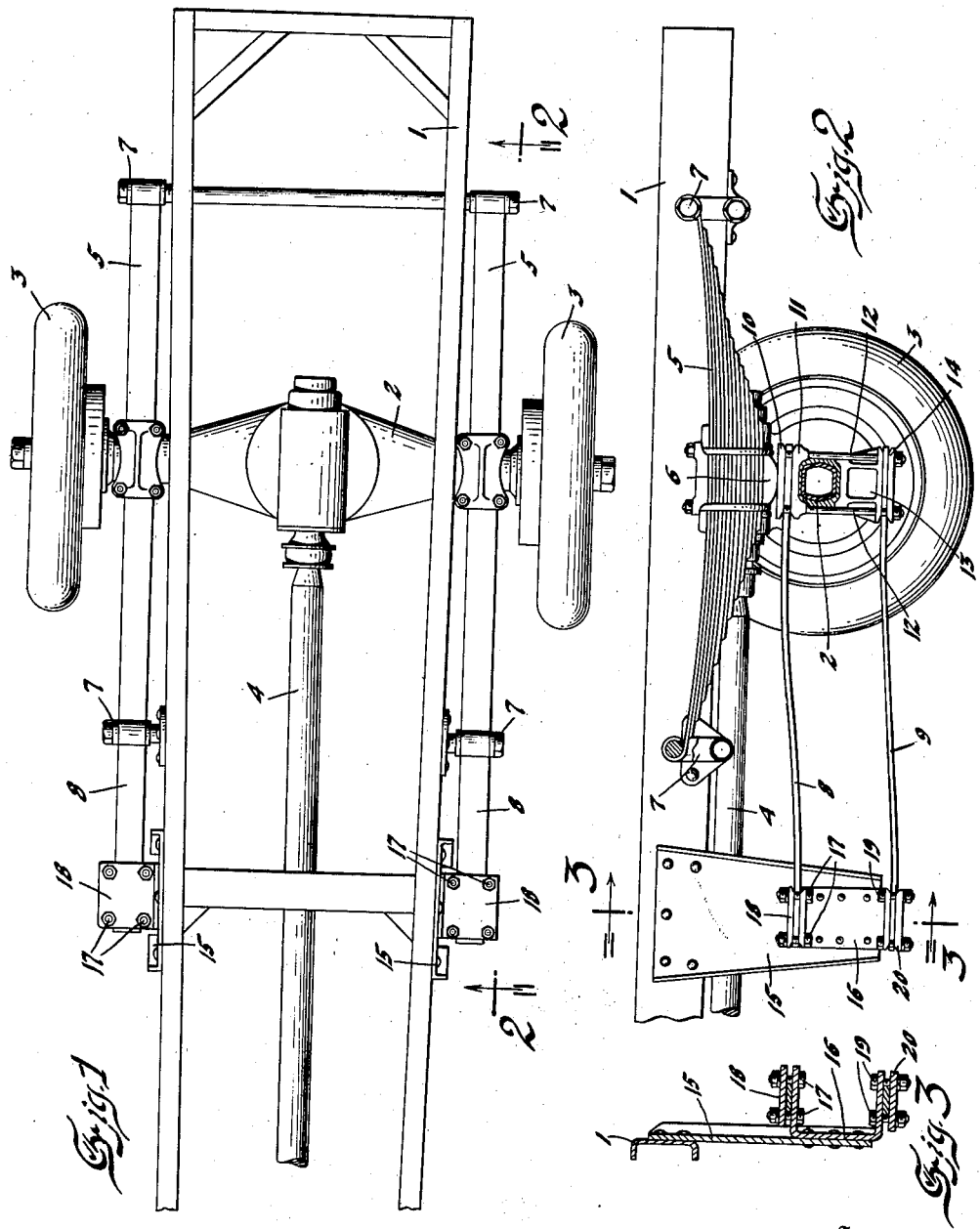
Inventors
Carl J. Bock &
William D. Reese
By
Blackmore, Spencer & Fluke
Attorneys Nov. 24, 1931.   C. J. BOCK ET AL   1,833,405
RADIUS ROD
Filed Sept. 20, 1929   3 Sheets-Sheet 2
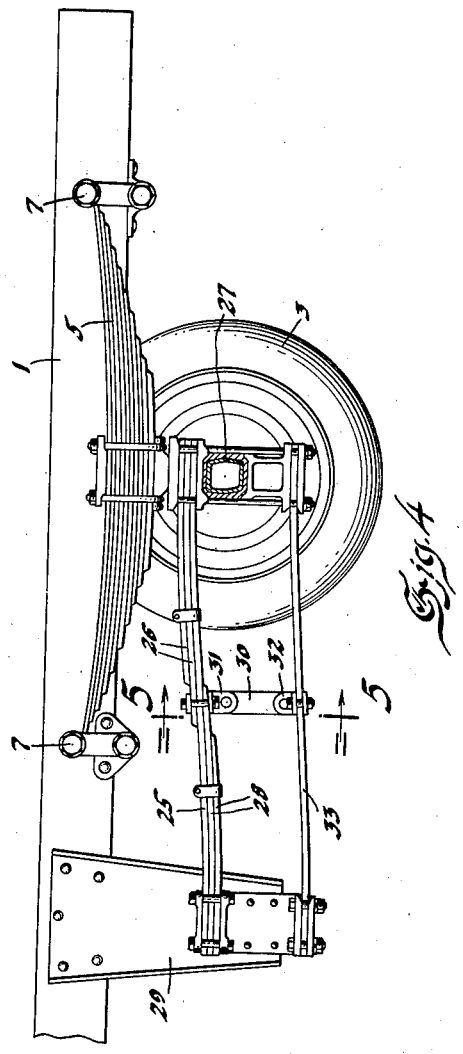
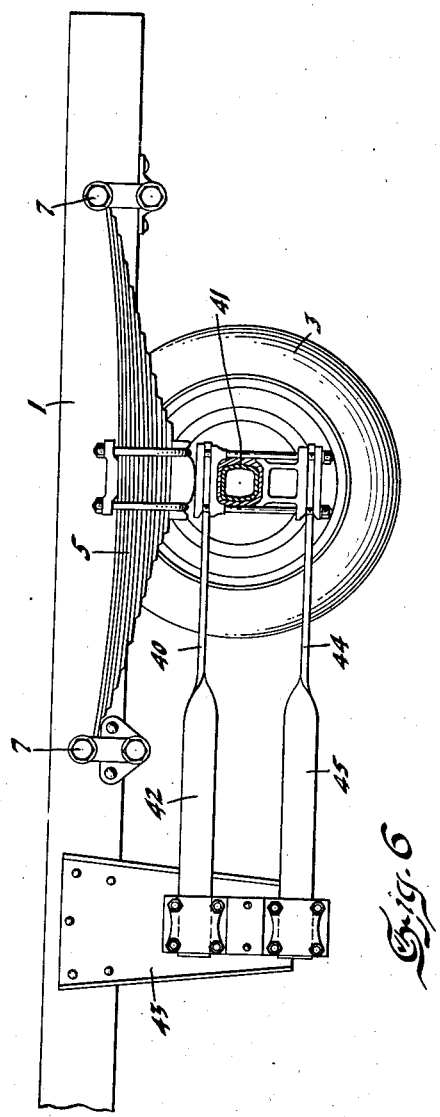
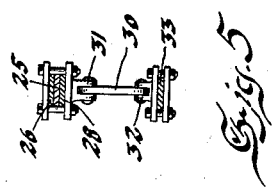
Inventors
Carl J. Bock &
William D. Reese
By Blackmore, Spencer & Finch
Attorneys Nov. 24, 1931.  C. J. BOCK ET AL  1,833,405
RADIUS ROD
Filed Sept. 20, 1929   3 Sheets-Sheet 3
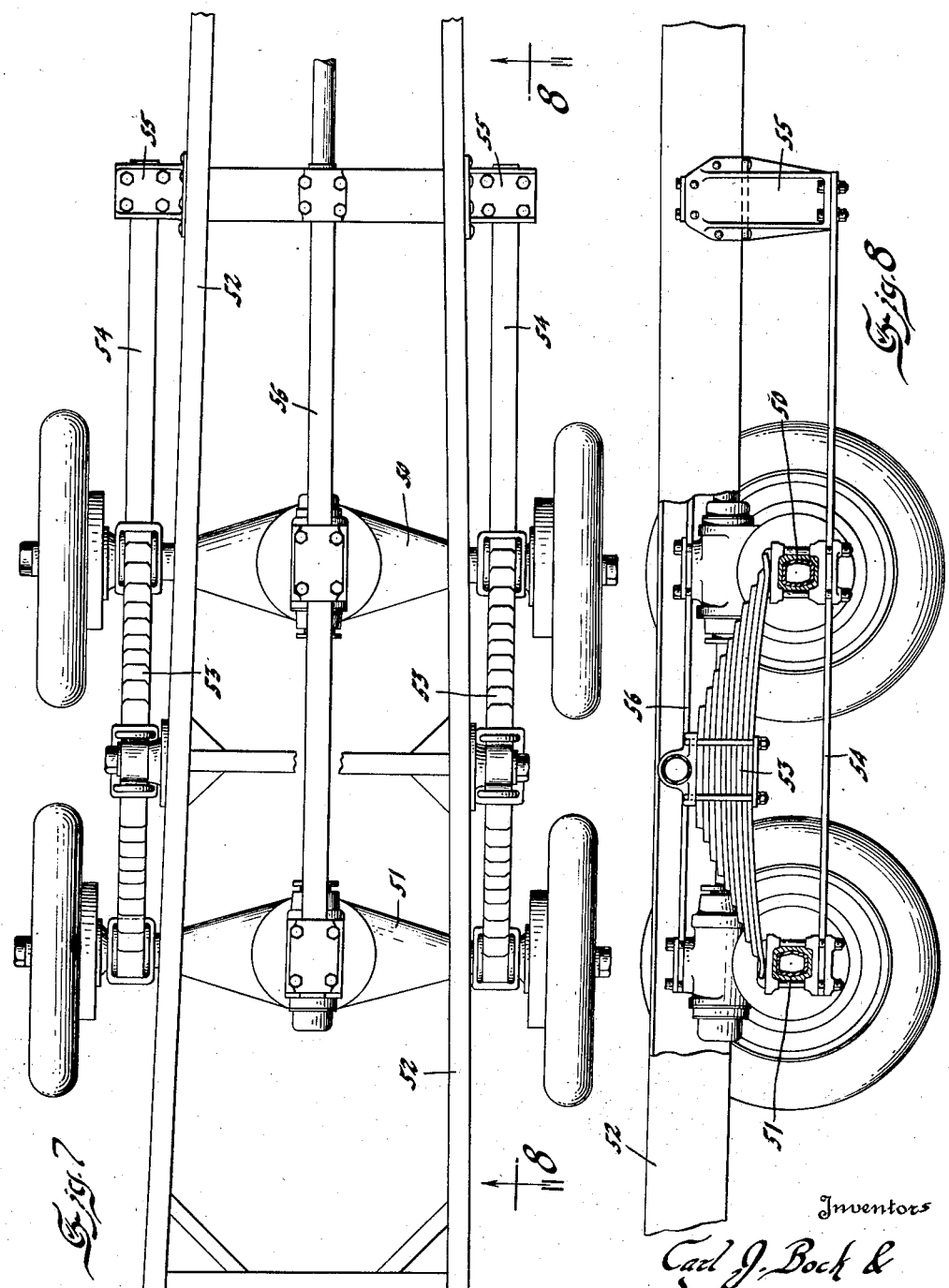

Patented Nov. 24, 1931

1,833,405

UNITED STATES PATENT OFFICE

CARL J. BOCK AND WILLIAM D. REESE, OF BIRMINGHAM, MICHIGAN, ASSIGNORS TO YELLOW TRUCK & COACH MANUFACTURING COMPANY, OF PONTIAC, MICHIGAN, A CORPORATION OF MAINE

RADIUS ROD

Application filed September 20, 1929. Serial No. 393,943.

This invention relates to motor vehicles and more particularly to an improved drive connection for transmitting thrust between the axle and frame and for maintaining the axle in proper transverse relation with the chassis frame while permitting the movement of the axle and frame to and from each other during deflection and retraction with the customary load supporting springs interposed between the frame and axle.

Conventional constructions of this sort have usually consisted of a rigid tie rod at each side of the vehicle connected at its opposite ends to the axle and frame respectively through universal joints. Because of the driving conditions that have heretofore prevailed, these rigid distance struts have been generally satisfactory except possibly for the fact that the joints require frequent lubrication and are apt to become noisy and rattle after the moving parts begin to wear. Under more recent conditions, due in a measure to increased traffic and consequent congestion on the roads and to improved designs in engine and traction apparatus, motor vehicle manufacturers are now producing cars of a wide speed range that are capable of quick starting and stopping and these things obviously bring about the imposition of terrific and sudden strains on the various parts of the vehicle and especially the drive mechanism and thrust transmitting connections between the frame and axles. Rigid radius rods must necessarily withstand and transmit the full force of thrust or tortional stress and various reactions, and severe strains are, therefore, placed on the parts particularly at times of sudden acceleration and deceleration.

To meet the new conditions and overcome the disadvantages and objectionable characteristics of constructions heretofore in use are among the primary objects of the present invention, which contemplates the use of flexible struts as distance members or radius rods to secure proper wheel alinement.

Another object of the invention is to provide an improved drive connection for transmitting the normal driving thrust between the axle and frame but which will be sufficiently flexible or yieldable to accommodate movement of the axle at right angles to the longitudinal axis of the chassis frame while maintaining it in a definite transverse relation and resisting its tendency to move longitudinally and to overcome and cushion torque reactions, both accelerated and decelerated, and the sharp thrusts incident to sudden speed changes.

A further object of the invention is to provide a distance member that will have an inherent degree of resiliency or elasticity to take care of the necessary relative movement of the parts and the damping of shocks and stresses, and which may be rigidly and firmly connected to its associated parts so as to eliminate loose joints and rattle incident thereto, as well as the necessity for lubrication or other attention in use.

A still further object of the invention is to provide a construction which, because of its simplicity in design, makes for economy in motor vehicle manufacture and permits the use of parts that are readily available on the open market and requires no skilled or experienced workmen to install either in the factory or service field.

Various other objects and features of advantage will become apparent during the course of the following specification when taken in connection with the accompanying drawings, wherein Fig. 1 is a top plan view of a rear portion of a motor vehicle chassis in which is embodied the present invention.

Fig. 2 is a side elevation of the parts shown in Fig. 1 with the axle in section as taken on line 2—2 of Fig. 1.

Fig. 3 is a transverse section on line 3—3 of Fig. 2.

Fig. 4 is a side elevational view of a modified form of the invention.

Fig. 5 is a section taken on line 5—5 of Fig. 4.

Fig. 6 is a side elevation showing an alternative construction.

Fig. 7 is a fragmentary top plan view showing the invention embodied in a tandem drive axle assembly.

Fig. 8 is a sectional view with parts broken away and is taken on line 8—8 of Fig. 7.

While all the figures of the drawings show the invention applied to the rear axle of a vehicle and the following description will be limited to the constructions shown in the drawings, it will be understood that the distance members may be applied with equal facility to the front axle.

Referring specifically to the drawings, the reference numeral 1 indicates a chassis frame and the numeral 2 is applied to the drive axle unit having on opposite ends thereof the road wheels 3—3 which are driven through suitable mechanism by the propeller shaft 4 connected with the customary power plant or engine of the vehicle. Adjacent each end of the axle and located as close as possible to the wheels 3—3, are a pair of load supporting springs 5—5, shown in the present case as being of a semi-elliptic multiple leaf type, rigidly connected at an intermediate point to a spring pad or seat 6 carried by the axle, and fastened at each end with the chassis frame by swinging shackle links 7. Because of the shackle connections, both ends of each spring are free to move upon the longitudinal extension and contraction of the springs upon their deflection and retraction when the axle and frame move toward or away from one another. The springs, therefore, serve merely to support the load of the chassis upon the axle and they transmit little or no thrust between the axle and frame.

In order to transmit the driving thrust, there are provided in the instant case, on each side of the frame, a pair of bars or straps 8 and 9 extending in substantially horizontal planes spaced vertically one from another. These bars are preferably formed from flat spring steel or material similar to that of the leaves of the load supporting springs. The rear end of the upper bar or strap 8 is rigidly secured to the axle as by means of a pair of clamp plates 10 and 11, on opposite sides thereof, interposed between the top of the axle 2 and the spring pad 6 and preferably held in place by the studs or fastening bolts 12, which may also hold in place beneath the axle 2, a spacer member 13 and clamp plate 14 for securing the rearmost end of the lower strap 9. At the opposite or forward ends of the two spring leaves is located a dependent frame bracket 15, suitably fastened as by rivets or bolts to the longitudinal side member of the chassis frame, and carrying at its lower end a channel shaped member 16, to the upper flange of which is secured, as by means of bolts 17, a clamp plate 18 for rigidly fastening the forward end of the upper leaf 8, while the fastening bolts 19 secure to the lower flange of the bracket member 16 a clamp plate 20 for fixing the forward end of the lower strap 9 thereto. Thus, the two straps are rigidly connected to the axle and frame, thereby obviating the necessity for loose joints.

Since both distance members 8 and 9 are inherently flexible in a direction angular to their flat surfaces and because these surfaces lie in horizontal planes, the straps will give or yield to accommodate the up and down movement of the axle relative to the chassis frame but will resist longitudinal movement of the axle, so as to maintain the wheels in proper alinement, prevent twisting of the axle from its position at right angles to the longitudinal axis of the chassis and insure the proper transmission of the driving thrust from the axle to the frame. The two spring members being located above and below the axle or on opposite sides of its axis, will also cushion what is known as torque reaction or the tendency for the axle to rotate in a clockwise or counter-clockwise direction, depending on whether the vehicle is moving forward or backward and which tendency is intensified during speed changes and most severe upon quick starts, rapid speed increases and sudden application of the brakes to retard or completely stop the movement of the vehicle. In the event this torque reaction tends to rotate the axle in a clockwise direction, then the upper spring 8 is placed under tension while the lower spring 9 is placed under compression, while if the tendency is to rotate the axle counter-clockwise, the lower strap 9 is tensioned and the upper strap 8 is compressed. This relative compression and tension of the two spring members will serve to cushion and dampen the shocks and strains originating in the axle because of the torque reactions, as will be readily apparent.

In some cases, it may be found desirable to strengthen either or both of the spring leaves by the additional use of auxiliary leaves as is illustrated in Fig. 4. In this figure, the upper distance member is shown as comprising a main leaf 25 having superposed on its upper side the auxiliary leaves 26 extending from an intermediate point rearwardly where they are clamped with the rear end of the main leaf to the axle 27 and having on its under side the auxiliary leaves 28 extending from an intermediate portion to the forward end of the main leaf where they are secured with the main leaf to the frame bracket 29. To prevent the two distance bars spreading apart, there may be provided a tie bar or link 30 pivoted at one end to a bracket 31 which is clamped to an intermediate portion of the upper member, and pivoted at its other end to the bracket 32 clamped to the lower spring leaf 33.

It may be feasible in certain installations to make use of the tie bars in cushioning sideways or the slight tendency for the frame and axle to move transversely to each other. For this purpose, the arrangement shown in Fig. 6 may be employed, wherein the upper distance member comprises a horizontal portion 40 rigidly connected to the axle 41 above its axis and a vertical portion 42 secured to the frame bracket 43, while the lower bar comprises similar horizontal and vertical portions 44 and 45 respectively, each bar being formed by twist20 ing the two portions at an angle of 90° to each other.

The tie bars before referred to may be used to good advantage in those constructions employing a pair of longitudinally spaced drive axles, in which case the bars are simply extended rearwardly and connected to the second axle in the same manner that they are connected with the first. To better illustrate, Figs. 7 and 8 show a tan30 dem axle arrangement, wherein the numerals 50 and 51 indicate the two axles which support the chassis frame 52 through the load supporting springs 53—53 on opposite sides of the frame. These springs are shown as being pivotally mounted on the transverse axis at an intermediate portion to the frame and as having a sliding engagement at opposite ends with suitable spring pads carried by the two axles. In the same vertical plane with each load supporting spring 53 and below the axles is a spring leaf distance member 54 rigidly connected at its rearward end to the axle 51; at an intermediate point to the axle 50 and at its forward end to the frame bracket 55. In this particular instance, a single spring strap 56 is shown above the axle and this is located centrally of the chassis frame and is secured to the upper surface of the differential hous50 ing of each axle 50 and 51 and with a transverse member of the chassis frame.

Various other arrangements of the several spring bars above and below the axle may be readily made, as will be apparent to those skilled in the art, and the invention is not to be limited to the exact details here described and shown, but it will be understood that such modifications may be made as come within the scope of appended claims.
We claim:

1. In a motor vehicle, a chassis frame, an axle extending transversely of the frame, a pair of longitudinally extending load supporting springs interposed between the frame and axle and on opposite sides of the frame, with both ends of each spring free to move in a longitudinal direction, and a series of flexible spring leaf distance members having rigid connections with both the frame and axle, with at least one of the members connected with the axle above the axis thereof, and at least one of the members connected with the axle below the axis thereof.

2. In a motor vehicle, a chassis frame, an axle extending transversely of the frame, a pair of longitudinally extending load supporting springs interposed between the frame and axle and on opposite sides of the frame, with both ends of each spring free to move in a longitudinal direction, a pair of flexible spring leaf distance members between the frame and axle, and rigid connections between the opposite ends of each member and the frame and the axle respectively, the connections with the axle being on opposite sides of the transverse axis of the axle.

3. In a motor vehicle, a chassis frame or the like, a drive axle unit, means to flexibly carry the frame on said unit and which permits relative longitudinal movement therebetween, a pair of vertically spaced distance rods extending in a general longitudinal direction and each formed of spring metal, rigid connections between the corresponding ends of the rods and the frame; and means to rigidly connect the corresponding opposite ends of the rods to the axle unit and at points above and below the transverse axis thereof.

4. In a motor vehicle, a drive axle, a frame flexibly supported on the axle, and means to transmit driving thrust from the axle to the frame including a main leaf spring, and auxiliary spring leaves superimposed on opposite sides of the main leaf, with adjacent ends in overlapping relation, and means to connect the other ends of the auxiliary leaves and the adjacent portions of the main leaf at its opposite ends with the frame and axle respectively.

5. In a motor vehicle, a drive axle, a frame flexibly supported on the axle, and means to transmit driving thrust from the axle to the frame including a main leaf spring and auxiliary spring leaves positioned on opposite sides of the main leaf, with one of the auxiliary leaves extending from an intermediate portion of the main leaf to one end thereof and another of the auxiliary leaves on the other side of the main leaf extending from an intermediate portion of the main leaf to the opposite end thereof, and means to rigidly connect the opposite ends of the main leaf and the adjacent portions of the auxiliary leaves to the frame and axle respectively.

6. In a motor vehicle, a drive axle, a frame flexibly supported on the axle, and means to transmit driving thrust from the axle to the frame including a main leaf spring and auxiliary spring leaves superimposed on opposite end portions of the main leaf and on opposite sides thereof and means to connect opposite ends of the main leaf to the frame and axle respectively.

7. In a motor vehicle, an axle, a chassis frame flexibly supported on said axle, and thrust transmitting means between the axle and frame, including a pair of spring blades fastened to the axle on opposite sides of its axis, each of said blades comprising portions twisted angularly in relation with one another.

In testimony whereof we affix our signatures.

W. D. REESE.
C. J. BOCK.